United States Patent [19]

Silberstang

[11] Patent Number: 4,830,059

[45] Date of Patent: May 16, 1989

[54] RELATIVELY ARTICULATABLE HOSE

[76] Inventor: A. Barry Silberstang, 9 E. 19th St., Newe York, N.Y. 10003

[21] Appl. No.: 636,566

[22] Filed: Aug. 1, 1984

[51] Int. Cl.$^4$ .............................................. F16L 11/10
[52] U.S. Cl. .................................................. 138/130
[58] Field of Search ............... 138/109, 129, 130, 133, 138/DIG. 8, 134

[56] References Cited

U.S. PATENT DOCUMENTS

| | | | |
|---|---|---|---|
| 1,590,666 | 6/1926 | Angell | 138/134 X |
| 2,540,203 | 2/1951 | Hatcher, Sr. | 138/134 X |
| 2,740,427 | 4/1956 | Swan, Jr. | 138/133 X |
| 2,986,169 | 5/1961 | McCormick | 138/109 |
| 2,998,474 | 8/1961 | Pavlic | 138/133 X |
| 3,847,184 | 11/1974 | God | 138/DIG. 8 |
| 4,452,280 | 6/1984 | Werner | 138/131 |
| 4,463,779 | 8/1984 | Wink et al. | 138/DIG. 8 |
| 4,489,759 | 12/1984 | Yamamura | 138/DIG. 8 |

Primary Examiner—Werner H. Schroeder
Attorney, Agent, or Firm—Philip Furgang

[57] ABSTRACT

A hose body is formed, or provided, to a predetermined length and so as to be continuous and contiguous. Articulation means are formed about and in close proximity to the hose body. This is accomplished by forming a wire helix about the hose body so as to either have a different number of turns per unit length of hose for first, second and third portions of the hose body, or by utilizing multiple strands of wire of different thickness for some portions of the helix and not for others, or by forming single helixes for some hose portions and double helixes for others; or by combinations of the above. The hose portions thus provided with articulation means have a different relative degree of articulation with respect to each other. As such they not only resist being articulated with different degrees but they also resist being straightened or straightening on their own with different degrees.

20 Claims, 1 Drawing Sheet

U.S. Patent — May 16, 1989 — 4,830,059
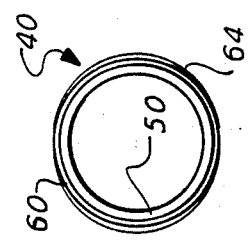
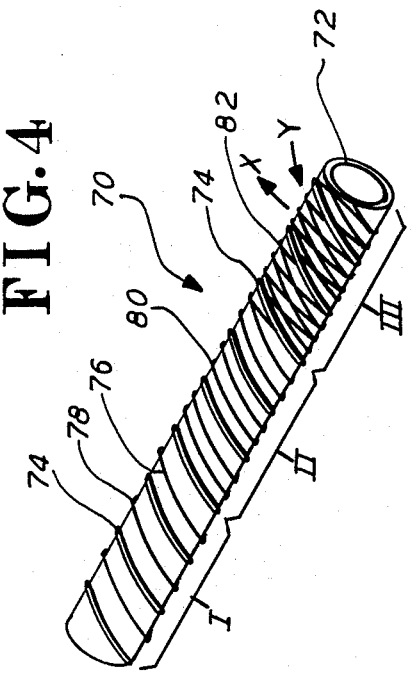
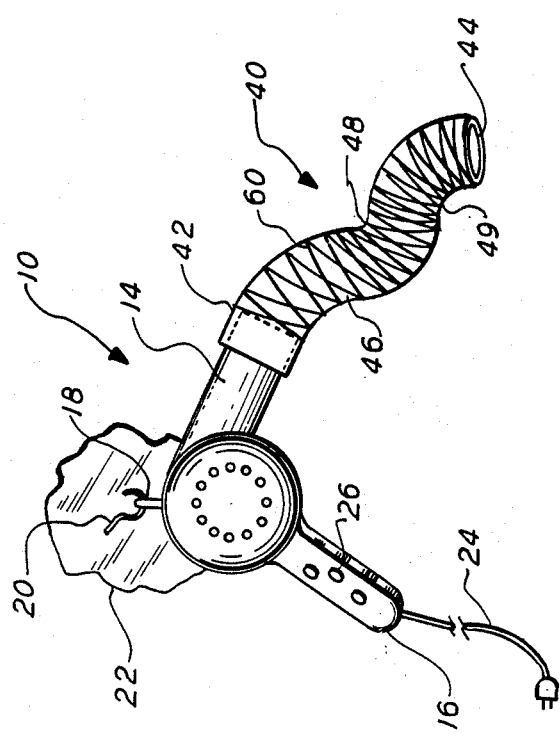
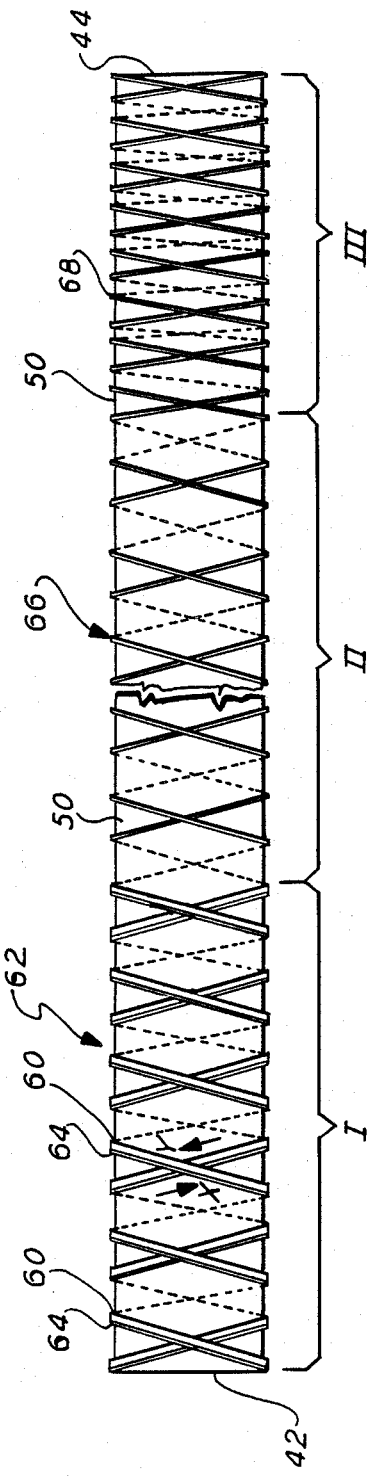

RELATIVELY ARTICULATABLE HOSE

BACKGROUND OF THE INVENTION—FIELD OF APPLICATION

This invention relates to hose; and more particularly to hose which is articulatable, either in whole or in part, into one or more selected configurations.

BACKGROUND OF THE INVENTION—DESCRIPTION OF THE PRIOR ART

Hose, tubes, pipes, and similar conduits find extensive use for enclosing, providing a prescribed path or course, and otherwise conducting a fluid from one place to another. The fluid may be a liquid moving under pump pressure or even gravity, from a reservoir to an outlet; or it may be air moving under force of an impeller towards an end use. The number of examples of liquids and gases, and the like, and possible uses thereof are too extensive to list. However, unless such are to merely follow their own course then their movement from one place to another must be guided, enclosed and protected by some form of conduit such as a hose.

Hose, tubes, pipes and similar conduits also find extensive use for enclosing, providing a prescribed path or course, and otherwise conducting solid like members that extend between two locations, or are to be moved from one place to another. Such solid like members may be electrical wire, lines, cables, or the like that extend from one place to another; or they may be light conducting optical fibers or similar items. The solid like members may be rigid but more often than not they are flexible.

Available hose, pipes, conduits and the like may be of the type shown in: U.S. Pat. No. 2,861,598 granted on Nov. 23, 1958 to S. D. Carder Jr. et al for *Flexible Duct Construction;* a U.S. Pat. No. 2,365,286 granted on Dec. 19, 1944 to J. Moseley et al for Flexible Tubing; U.S. Pat. No. 2,927,625 granted on Mar. 8, 1960 to E. M. Rothermel et al for *Method Of Making A Reinforced Corrugated Hose;* and U.S. Pat. No. 4,167,953 granted on Sept. 18, 1979 to B. I. Carlstrom for *Reinforced Tube Of Plastic And A Method Of Manufacturing The Same.* These constructions provide for tubes, conduits and hose which can be articulated to form a bend but must usually be secured in place to maintain such bend because the material from which the hose is formed has a tendency to straighten out. Or once so bent the hose cannot be straightened out without damage or other permanent deformation. Even those of the hoses which utilize wire helixes in their construction, for reinforcement or other purposes, are sometimes difficult to maintain in a bent or articulated configuration; or to straighten out once so articulated.

Some available hoses such as shown in U.S. Pat. No. 4,223,702 granted on Sept. 23, 1980 to James Cook for *Drain Line For Recreational Vehicles* can be extended and contracted but are otherwise wrapped in such a way as to prevent articulation around curves. Other available hoses, such as shown in U.S. Pat. No. 3,836,750 granted on Sept. 17, 1974 to R. Caruso for *Hair Dryer* and in U.S. Pat. No. 4,176,662 granted on Dec. 4, 1979 to R. E. Frazer for *Apparatus For Endoscopic Examination,* may be selectively articulated but either require additional attachments to do so or are relatively complex and expensive and when so selectively articulated are permanently modified in a way that may not be acceptable or conducive to further selective articulation.

SUMMARY OF THE INVENTION

It is therefore an object of this invention to provide a new and improved hose.

It is another object of this invention to provide a new and improved articulatable hose.

It is still another object of this invention to provide a new and improved relatively articulatable hose.

It is yet another object of this invention to provide a new and improved hose which can be selectively and readily articulated into one or more selected configurations.

It is yet still another object of this invention to provide a new and improved hose modification which will render the hose relatively articulatable.

It is a further object of this invention to provide a new and improved relatively articulatable hose which resists selective articulation to a different degree, along selected portions of the hose.

This invention involves relatively articulatable hose; and contemplates constructing same, or modifying a hose construction, by providing thereabout a single or multiple helix of flexible wire that is so provided that the helix is either of different thickness along selected portions of the length of the hose, or so that the helix is wound at different numbers of turns per running length along selected portions of the length of the hoses, or both. By so constructing, or modifying the construction of, a hose it is not only selectively and relatively articulatable but selectively articulatable in such a way that the hose resistance to such articulation may be varied along the length of the hose; and as such the hoses resistance to being straightened or to straightening is also commensurately varied or variable.

BRIEF DESCRIPTION OF THE DRAWING

In the drawing:

FIG. 1 is a schematic perspective showing of a hair dryer with a hose incorporating the instant invention;

FIG. 2 is an elevational view of the hose of FIG. 1 enlarged and straightened out to better show details thereof;

FIG. 3 is an end view of the hose of FIG. 2; and

FIG. 4 is a perspective showing of a modified hose construction incorporating the instant invention.

BRIEF DESCRIPTION OF THE PREFERRED EMBODIMENT

For convenience, the invention will be described as applied to hose of generally plastic tubular construction with one or more flexible aluminum wires of different thickness wound thereabout in one or more helixes; and which is utilized to conduct hot air generated by a portable hair dryer from the dryer to a place removed from the dryer. It should be understood, nevertheless, that without departing from the spirit of the invention: that the hose may be formed from any convenient, suitable and available material; that the wire may be wound in a single or double helix; that either more or less than one strand of wire may be used and such strands may be of the same or different thickness or diameters; that the hose may by used with stationary hair dryers or to otherwise conduct air or other fluids (gaseous or liquid) from one place to another; or that the hose may be utilized to facilitate the positioning of light conducting optical fibers or other solid like but flexible members.

With reference to FIG. 1, there is generally shown at 10 a hair dryer of the personal portable type including a central section 12 which houses a blower and heat generating means (not shown) of conventional construction. A snout 14 is provided to conduct the heated air from the blower and towards the user's hair (or whatever else is to be dried). While a handle 16 is provided for holding dryer 10 there is also provided a hook opening 18 for reception on a hook 20 to facilitate hanging up dryer 10 on a wall 22 or the like. When so hung up both hands of the user are available for other purposes, such as manipulating the hair while it is being dryed.

An electrical wire 24 extends from blower section 12 of dryer 10 and connects the blower thereof to a suitable source of electrical power for operating the blower and heating elements. One or more switches 26 are provided in handle 16 for controlling the operating of dryer 10.

A hose 40 (FIGS. 1 and 2) has one of its ends 42 disposed about snout 14 of dryer 10 and its other end 44 disposed at a location remote from the end of snout 14; to guide and direct the heated air from dryer 10 to such remote location. Hose 40 is bent or articulated to change directions at 46, 48 and 49 to so diret the heated air to the remote location. The hose when bent or articulated, does not resiliently return to its original configuration as illustrated in FIG. 1.

Hose 40 includes a generally tubular body portion 50 (FIGS. 2 and 3) which is formed of plastic rubber or other suitable material and so as to be contiguous and otherwise to enclose, direct and guide the movement of fluid passing through hose 40. Body portion 50 may be formed to any convenient thickness and in one or more layers as long as it remains flexible and articulatable.

A first strand or length of wire 60 (FIGS. 1 and 2) is wound as a first helix 62 about body portion 50 of hose 40. Helix 62 extends from end 42 of hose 40 along a first portion I of the length of hose 40. It should be noted that helix 62 is a double helix in that it, and wire 60, is first wound in the direction of arrow X (FIG. 2) and it a then wound or returned in the direction of arrow Y (FIG. 2). Helix 62 may be otherwise formed by winding a first wire (such as wire 60) in the direction of arrow X and by then winding a second wire (such as wire 60) in the direction of arrow Y.

A second strand or length of wire 64 is wound about hose body 50 as a second helix 66. Helix 66 extends from end 42 of hose 40 all the way to end 44 of hose 40. However, it should be noted that for hose length portion I wire 64 is disposed adjacent wire 60 of helix 62 and coacts therewith to provide a relatively stiff helix for hose portion I. Wires 60 and 64 may be secured together as by welding or an appropriate adhesive if so desired.

For a hose length portion II (FIG. 2) wire 64 is wound into helix 66 with a first frequency or number of turns per unit length of hose portion II; while for a hose portion III wire 64 is wound into helix 66 with an increased frequency or number of turns per unit length of hose portion III. If desired helix 66 for hose portion III may be regarded as a third helix 68. The increased frequency of the helix of wire 64 for hose portion III renders that portion of hose 40 more resistant to being articulated than hose portion II and as such more resistant to being straightened or to straightening on its own.

It should again be noted that helix 66 is a double helix in that it, and wire 64, is first wound in the direction of arrow X and then returns in the direction of arrow Y. The same applies to helix 68. Helix 66, and helix 68, may otherwise be formed by winding a first wire (such as wire 64) in the direction of arrow X and by then winding a second wire (such as wire 64) in the direction of arrow Y.

Wires 62 and 64 are preferably formed from aluminum but may just as well be steel, plastic or of other suitable material.

An alternative hose construction is shown in FIG. 4 where there is generally shown at 70 a hose formed with a body portion 72 of plastic, rubber or other suitable material formed into a continuous and contiguous tube. Hose body 72 is formed with ribs distributed along its length. Ribs 74 are of conventional construction and are formed into the body of hose 70 to add strength thereto.

Wound about hose 70 is a single strand of wire 76 which is formed into a single helix 78 for a first length I of hose 70 and with a first predetermined number of turns per unit length of hose 70. Thereafter, wire 76 continues to form a helix 80 which has an increased number of turns per unit length than those for helix 78 for a second length II of hose 70. Wire 76 is then further utilized to form a third helix 82 for the remaining length III of hose 70. Helix 82 is a double helix in that it first is wound in the direction X (FIG. 4) and then in the direction Y.

If desired, instead of using a single wire 76 to form helixes 78, 80 and 82, a different wire may be used for each helix or one wire used for two of the three helixes and another wire for the remaining heix.

As for the embodiment of FIGS. 1-3 the frequency of turns of the wire per unit length of hose 70 willddetermine the degree of resistance to articulation for hose 70; as well as the degree of stability once so articulated. Wire 76 is preferably aluminum wire but may be fabricated from steel, plastic or any other suitable material.

The wires utilized as described above for hoses 40 and 70, once wound about their respective hose bodies, may be considered to form thereabout and therewith an articulation facilitation means. Such wires preferably have a round cross-section but they may have a square, oval, or other convenient cross-section. While the wires have been shown to merely surround their respective hose bodies they may just as well be covered. The wires, in addition, are to be selected from wire material which will hold its shape when formed into the desired helix or helixes. Furthermore the wire, when so wound about the hose body, and the hose combined therewith must co-operate to accept and retain their positions once articulated; and to accept and retain their positions when straightened after being articulated, or when articulated into another configuration. The combined wire and hose should be such that there is little or no tendency to straighten out on their own once articulated and such that either single or multiple articulatons will not cause the wire to break.

From the above description it will thus be seen that there has been provided a novel and improved relatively articulatable hose, and means for rendering a hose relatively articulatable.

It is understood that although I have shown the preferred forms of my invention that vaiious modifications may be made in the details thereof without departing from the spirit as comprehended by the following claims.

What is claimed is:

1. A relatively articulatable hose comprising:
   (a) hose body means for conducting a fluid having a predetermined tubular configuration and have a predetermined length;
   (b) articulation means, disposed about said hose body means, for facilitating relative articulation of said hose body means;
   (c) said articulation means including wire means for providing relative degrees of articulation of said articulation means being formed into a first helical configuration about a first predetermined portion of the length of said hose body means, and a second helical configuration about a second predetermined portion of the length of said hose body means; said first helical configuration having a helix of greater frequency than said second helical configuration; said differing frequencies of said articulation means thereby rendering said hose body means relatively articulatable;
   (d) the relative degree of articulation of said articulation means for said first predetermined portion of the length of said hose body means being different from the relative degree of articulation of said articulation means for said second predetermined portion of the length of said hose body means such that said hose body means when one of said predetermined portions is angularly bent with respect to the other of said portions, said one portion does not resiliently return to its original position.

2. The relatively articulatable hose of claim 1, wherein said hose body means includes a third predetermined portion and said wire means is formed into a third helical configuration about said third predetermined portion of said hose body means and so that the relative degree of articulation thereof differs from that for said first and said second predetermined portions of said hose body means.

3. The relatively articulatable hose of claim 2, wherein said wire means includes a single strand of wire which is formed into said first, said second and said third helical configurations.

4. The relatively articulatable hose of claim 3, wherein said articulation means includes additional wire means formed into a helical configuration and disposed proximate said wire means for said first predetermined length of said hose body means.

5. The relatively articulatable hose of claim 4, wherein said additional wire means has a cross-sectional dimension which is different from the cross-sectional dimension of said wire means.

6. The relatively articulatable hose of claim 2, wherein said wire means is wire formed from aluminum.

7. The relatively articulatable hose of claim 6, wherein said wire mean is wire of round cross-sectional configuration.

8. The relatively articulatable hose of claim 2, wherein said helical configuration into which said wire means is formed includes a double helix in that said wire means is formed into a helix extending from a first end of said hose body means to a second end of said hose body means and then said helix is formed from said second end of said hose body means towards said first end of said hose body means.

9. The relatively articulatable hose of claim 2, wherein said wire means includes but a single strand of wire.

10. The relatively articulatable hose of claim 2, wherein said wire means includes multiple strands of wire.

11. The relatively articulatable hose of claim 1, wherein said hose body means includes a third predetermined portion and said wire means is formed into a third helical configuration about said third predetermined portion of said hose body means and so that the relative degree of articulation thereof differs from that for said first and said second predetermined portion of said hose body means.

12. The relatively articulatable hose of claim 11, wherein said wire means includes a single strand of wire which is formed into said first, said second, and said third helical configurations.

13. The relatively articulatable hose of claim 12, wherein said articulation means includes additional wire means formed into a helical configuration and disposed proximate said wire means for said first predetermined length of said hose body means.

14. The relatively articulatable hose of claim 13, wherein said additional wire means has a cross-sectional dimension which is different from the cross-sectional dimension of said wire means.

15. The relatively articulatable hose of claim 11, wherein said wire means is maded from aluminum.

16. The relatively articulatable hose of claim 15, wherein said wire means is of round cross-sectional configuration.

17. The relatively articulatable hose of claim 11, wherein said helical configuration into which said wire means is formed includes a double helix in that said wire means is formed into a helix extending from a first end of said hose body means to a second end of said hose body means and then said helix is formed from said second end of said hose body means towards said first end of said hose body means.

18. The relatively articulatable hose of claim 11, wherein said wire means includes but a single strand of wire.

19. The relatively articulatable hose of claim 11, wherein said wire means includes multiple strands of wire.

20. A relatively articulatable hose, comprising:
   (a) hose body means for conducting a fluid having a predetermined tubular configuration and have a predetermined length;
   (b) articulation means, disposed about said hose body means, for facilitating relative articulation of said hose body means;
   (c) said articulation means including first and second wire means for providing relative degrees of articulation of said articulation means, said first wire means being formed into a first helical configuration about a first predetermined portion of the length of said hose body means, and said second wire means comprising a second helical configuration about a second predetermined portion of the length of said hose body means; said first helical configuration comprising a wire of a first cross-sectional dimension and said second helical configuration comprising a wire of a second cross-sectional dimension; said first and second cross sections being different from one another to thereby render said hose body relatively articulatable;

(d) the relative degree of articulation of said articulation means for said first predetermined portion of the length of said hose body means being different from the relative degree of articulation of said articulation means for said second predetermined portion of the length of said hose body means such that said hose body means when one of said predetermined portions is angularly bent with respect to the other of said portions, said portion does not resiliently return to its original position.

* * * * *